US009118651B2

United States Patent
Kim et al.

(10) Patent No.: US 9,118,651 B2
(45) Date of Patent: Aug. 25, 2015

(54) CONTROL UNIT FOR IN-VEHICLE ETHERNET AND METHOD FOR CONTROLLING THEREOF

(71) Applicant: Hyundai Motor Company, Seoul (KR)

(72) Inventors: Dong Ok Kim, Yongin (KR); Junbyung Chae, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 109 days.

(21) Appl. No.: 14/087,732

(22) Filed: Nov. 22, 2013

(65) Prior Publication Data
US 2015/0146745 A1  May 28, 2015

(51) Int. Cl.
H04L 1/00   (2006.01)
H04L 12/28  (2006.01)
H04W 4/00   (2009.01)
(Continued)

(52) U.S. Cl.
CPC ...................................... *H04L 69/08* (2013.01)

(58) Field of Classification Search
CPC ......... H04L 12/10; H04L 12/40; H04L 12/50; H04L 12/66; H04L 12/40039; H04L 12/40045; H04L 12/40169; H04L 12/40182; H04L 29/12226; H04L 29/12235; H04L 47/266; H04L 61/2015; H04L 61/2023; H04L 69/08; H04L 49/351; H04B 3/44; H04W 88/02; H04W 88/06; H04W 48/18; H04W 52/0274; Y02B 60/34; Y02B 60/50; Y02B 60/1228; Y02B 60/1282; Y10T 307/724; B41J 2/04551; G05B 19/0426; G05B 23/0283; G05B 2219/23312; G05B 2219/25314; G06F 1/3203; G06F 1/3206; G06F 1/3287; G06F 21/85; G06F 21/554; G06F 13/387; G06F 13/4282; G06F 15/17343; G06F 2213/0016; G06F 2213/0042; G11C 11/4072; G11C 2207/105; G11C 2216/30; G11C 7/20; G11C 7/1063
USPC ......... 370/229–252, 254, 276–299, 311–312, 370/328, 332, 338, 400–411, 449–463, 370/469; 709/201–203, 208–216, 220–222, 709/227–229, 248–253
See application file for complete search history.

(56) References Cited

U.S. PATENT DOCUMENTS 5,938,771 A * 8/1999 Williams et al. ............... 713/310
6,795,450 B1 * 9/2004 Mills et al. .................... 370/463
(Continued)

FOREIGN PATENT DOCUMENTS

JP   2007-030593 A   2/2007
KR   10-2007-0082299   8/2007
(Continued)

*Primary Examiner* — Tri H Phan
(74) *Attorney, Agent, or Firm* — Mintz Levin Cohn Ferris Glovsky and Popeo, P.C.; Peter F. Corless

(57) ABSTRACT

The present invention relates to communication within a vehicle, and particularly relates to an in-vehicle Ethernet, and the vehicle comprising thereof. A physical layer device (PHY) according to one embodiment of the present invention may include a first pin receiving a power-on signal from exterior; a second pin which can be set as a first mode or a second mode; a decision unit which determines the mode in the second pin when the power-on signal is received at the first pin; and an operating preparation unit which initiates a communication by applying a predetermined value based on the mode in the second pin which is determined by the decision unit.

19 Claims, 3 Drawing Sheets

(51) Int. Cl.
*H04L 12/66* (2006.01)
*G06F 15/16* (2006.01)
*H04L 29/06* (2006.01)

(56) References Cited

U.S. PATENT DOCUMENTS

| | | | |
|---|---|---|---|
| 7,203,174 B2* | 4/2007 | Huff | 370/248 |
| 7,512,822 B2* | 3/2009 | Fung | 713/323 |
| 7,936,546 B2* | 5/2011 | Vorenkamp et al. | 361/87 |
| 8,069,293 B1* | 11/2011 | Rogan et al. | 710/301 |
| 8,432,142 B2* | 4/2013 | Vorenkamp et al. | 323/266 |
| 2005/0193087 A1 | 9/2005 | Swindells et al. | |
| 2006/0224754 A1 | 10/2006 | Jain et al. | |

FOREIGN PATENT DOCUMENTS

| | | |
|---|---|---|
| KR | 10-2010-0015510 | 2/2010 |
| KR | 10-2010-0015510 A | 2/2010 |
| KR | 10-1213458 | 12/2012 |
| KR | 10-2013-0082328 | 7/2013 |
| KR | 10-2013-0093811 A | 8/2013 |

* cited by examiner

CONTROL UNIT FOR IN-VEHICLE ETHERNET AND METHOD FOR CONTROLLING THEREOF

TECHNICAL FIELD

The present invention relates to communication within a vehicle, and particularly relates to an in-vehicle Ethernet, and the vehicle comprising thereof.

BACKGROUND OF THE INVENTION

Typically, communication between electronic control units (ECU) within a vehicle has been operated by a controller area network (CAN). However, due to relatively low speed of the CAN communication, it has been actively attempted to use a commercial Ethernet for communication between control units in the vehicle recently.

By using the commercial Ethernet, it may be possible to reduce cost for constructing a system with cheap commercial parts. It is also advantageous to keep wiring and connection structure simple by connecting local networks from ECUs to a main system bus.

If the Ethernet is used as above, a control unit may include a central processing unit (CPU) and a physical layer (PHY) device (e.g. a chip) which is capable of connecting the CPU to an external device. As noted in its abbreviation, the PHY device is directed to a physical layer, i.e., a connecting part of the control unit to the outer system. In particular, the PHY device may have functions incorporating a transceiver function which include receiving external signals, converting them into signals which is readable by CPU, decrypting encoded or modulated data into original packets and transferring such data to CPU.

Such a PHY device can be initiated to operate by receiving a predetermined value necessary for operation from the CPU via serial communication when booting of the CPU is completed. Therefore, while booting of the CPI is in process, the normal operation of PHY device cannot be secured. Meanwhile, several ECUs installed within a vehicle can include various types of CPUs, and their operating system (OS) can be different to each other. Thus, booting time of the CPU in each control unit can be different. With aforementioned reasons, when two or more of ECUs need to communicate through their individual PHY devices for a certain operation, for example, an operation of a rear view camera during which a camera controller unit and a head unit display controller unit work together, the PHY devices may not be able to operate properly because of any certain delay in one of the CPUs' booting and this may cause further delays in such operation.

SUMMARY OF THE INVENTION

The present invention provides a control unit which operates more efficiently in an Ethernet network provided within a vehicle and a method of controlling thereof.

In particular, the present invention provides a control unit including a physical layer device (PHY) which can determine configurations and initiate a communication without receiving a predetermined value from the CPU; and a method of controlling thereof.

While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In order to provide technical solutions to aforementioned technical difficulties, a physical layer device (PHY) according to one embodiment of the present invention may include a first pin receiving a power-on signal from exterior; a second pin which can be set as a first mode or a second mode; a decision unit which determines the mode configuration in the second pin when the power-on signal is received at the first pin; and an operating preparation unit which initiates a communication by applying predetermined value based on the mode determined by the decision unit.

In another exemplary embodiment, a control unit within a vehicle which provides an Ethernet may include a central processing unit (CPU); and a physical layer device (PHY) which is connected to the CPU through a first communication and a second communication. The physical layer device may include a first pin receiving a power-on signal from exterior and a second pin which can be set as a first mode or a second mode. When receiving a power-on signal at the first pin, the physical layer device can initiate the communication by applying a predetermined value based on the mode in the second pin.

In addition, the present invention provides a method of controlling a physical layer (PHY) device by receiving a power-on signal from exterior through a first pin; determining a mode in a second pin which can be set as a first mode or a second mode; and initiating a communication by applying a predetermined value based on the mode in the second pin.

According to exemplary embodiments providing such physical layer device, the control unit may operate more efficiently.

Particularly, as being separated from the CPU, the physical layer device in the present invention can be initiated with a wakeup interrupt and setting for its operation may be applied with a based on the predetermined pin configuration. Therefore, the communication can be initiated without being interrupted by booting delays of CPU.

A better understanding of the present invention may be obtained through the following examples which are set forth to illustrate, but are not to be construed as limiting the present invention. Those skilled in the art will recognize, or be able to ascertain using no more than routine experimentation, numerous equivalents to the specific procedures described herein.

BRIEF DESCRIPTION OF DRAWINGS

The above and other features and advantages of the present invention will become more apparent by describing in detail exemplary embodiments thereof with reference to the attached drawings in which.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

According to the present invention, a network within a vehicle can include an Ethernet. If the Ethernet is included in the network development for in-vehicle use, it can be advantageous to achieve faster communicating speed and reduce cost and time for research and development of such system by using a commercially available apparatus, such as an Ethernet communication chip, cable, hub and the like.

Hereafter, a physical layer device can be referred as, but not limited to, "PHY chip" according to an exemplary aspect. A physically device also may further include a various types of electronic devices.

Figure 1:
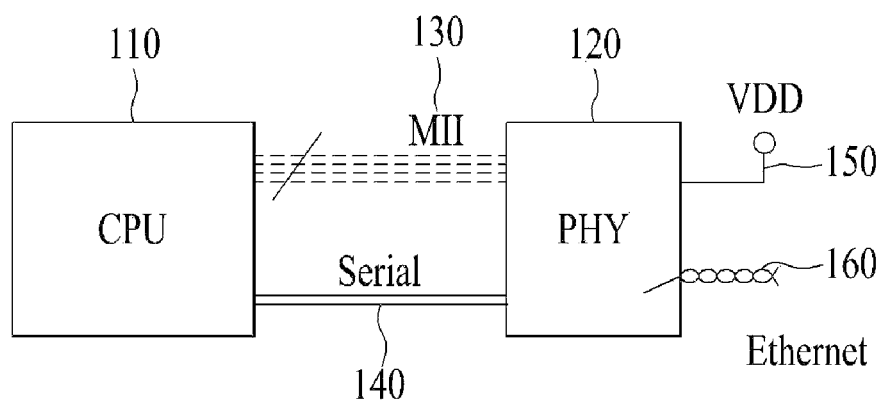
FIG. 1 illustrates a control unit within a vehicle including a CPU and a physical layer device (PHY) chip according to an exemplary embodiment of the present invention.

FIG. 1 is a diagram illustrating a control unit for a vehicle including a CPU and a physical layer device (PHY) chip according to an exemplary embodiment of the present invention.

As shown in FIG. 1, the control unit for the vehicle may include a CPU (110) and a PHY chip (120). The CPU (110) and PHY chip (120) can be connected through a Media Independent Interface (MII, 130) or a serial communication (140). The MII, as based on a commercial Ethernet standard defined in IEEE 802.3 and disclosed herein, may consist of a media access controller (MAC), a data interface between PHY devices and a management interface. The data interface is provided with individual channels of a transmitter and a receiver, and each channel has respective cluck, data or controlling signal. The management interface may consist of two-signal interface; one can be a signal for cluck, and the other can be a signal for data. Through the management interface, an upper layer can monitor and control the physical layer. As mentioned above, upon completion of booting, the CPU (110) can transfer the predetermined value by a serial communication (140) for the operation of PHY chip (120). Besides, the control unit within the vehicle may include a power supply (150) to PHY chip (12) and an interface (160) for connecting with other controllers via Ethernet.

Figure 2:
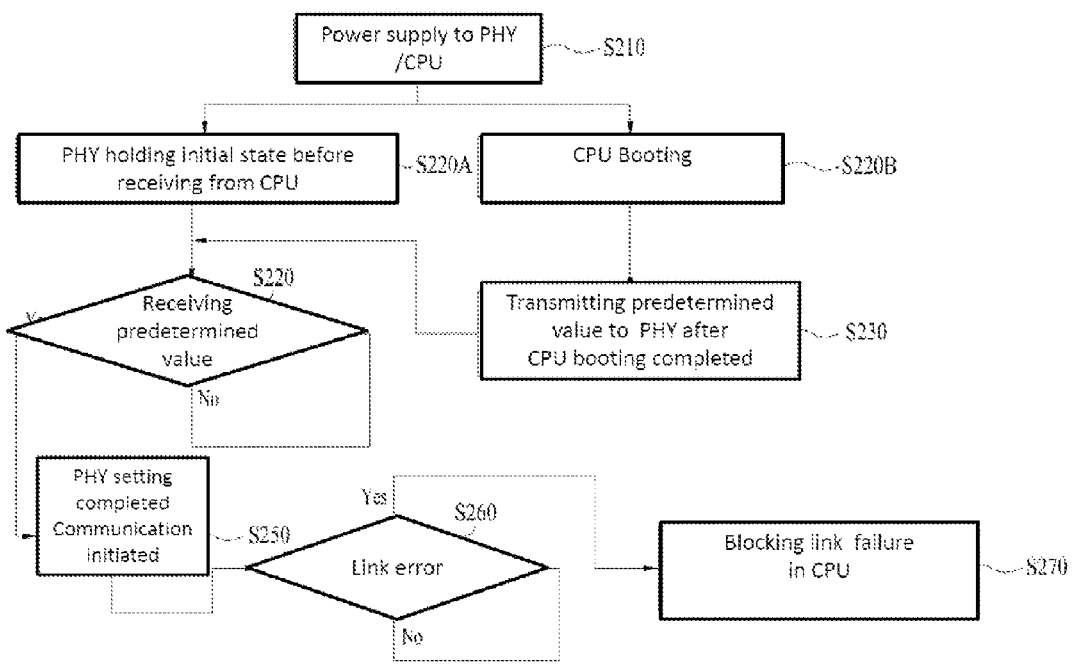
FIG. 2 is a flow diagram showing an operating process of the CPU and PHY chip in the control unit of FIG. 1 according to an exemplary embodiment of the present invention.

FIG. 2 is a flow diagram of an operating process of the CPU and PHY chip in the control unit of FIG. 1 according to an exemplary embodiment of the present invention.

As shown in FIG. 2, CPU and PHY chip start operation individually by supplying power to the control unit (S210). Specifically, the PHY chip holds its initial configuration until the predetermined value is transferred from the CPU (S220A) and in the CPU, booting of operating system (OS) or canal road is performed (S220B). When booting of the CPU is completed, the CPU transfers the predetermined value necessary for the operation of PHY chip through the serial communication (S230). When the predetermined value is successfully received (S240), the PHY chip is completed with its configuration based on the predetermined value and becomes ready for communication. Thereafter, the CPU may monitor errors in the Ethernet link (S260) and further determine whether it fails to link (S270).

The operating process described in FIG. 2 is beneficial in the respect that configuring of PHY chip gets flexible because the CPU transfers the predetermined value to the PHY chip. However, unlike the typically used commercial Ethernet, for the network within a vehicle, it does not frequently occur adding or removing network elements, so such network does not require such flexibility much. Moreover, in most in-vehicle Ethernet, the network is utilized to maintain applications rather than to operate links, therefore, such determining step of link failure may not be necessary.

Considering such specific features of the in-vehicle Ethernet, the predetermined values for operating PHY chip may not have to be changed from a particular value. Consequently, for the in-vehicle Ethernet, among many of the predetermined values, the initially predetermined value which is determined as a mater mode or a slave mode according to a relative arrangement with other control units may be sufficient Thus, in one exemplary embodiment, the present invention may include saving the predetermined values in the PHY chip prior to operation and completing configuration for PHY chip operation based on the pin mode which may be a master mode or slave mode instead of receiving the predetermined values from the CPU. Since initial setting in PHY chip is completed before CPU is booting, the PHY chip may operate immediately whether or not booting of the CPU is completed or not.

In some embodiments, when a power-on signal is generated in such control unit, PHY chip may need to be awake without being associated with the CPU. Accordingly, in certain exemplary embodiments, the present invention further includes providing with a separate interrupt pin in the PHY chip when the power-on signal is generated for a certain control unit. Therefore, when a power-on signal is generated, such power-on signal may be transferred directly to the PHY chip to generate an interrupt.

Figure 3:
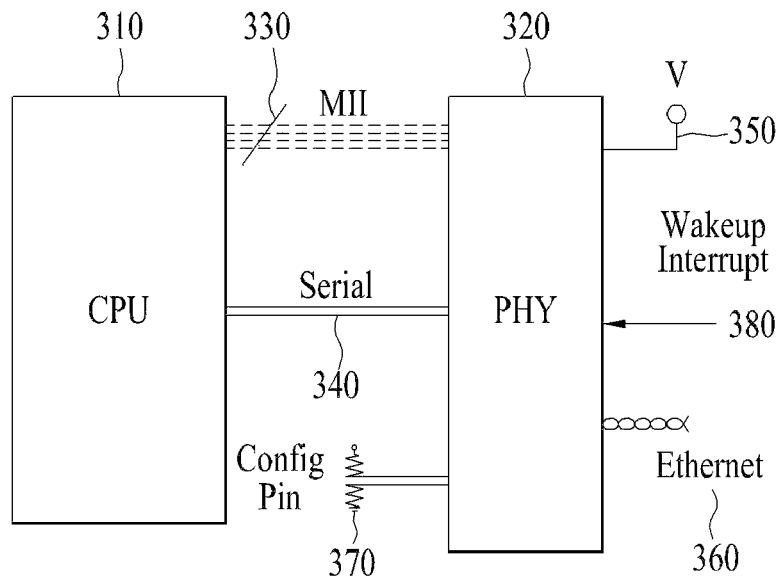
FIG. 3 is a diagram illustrating an exemplary structure of a control unit within a vehicle including a CPU and PHY chip according to one embodiment of the present invention.

As shown in FIG. 3, the present invention further provides a control unit construction according to another exemplary embodiment. FIG. 3 is a diagram illustrating an exemplary structure of a control unit including a CPU and PHY chip within a vehicle.

In FIG. 3, the control unit may include the CPU (310) and the PHY chip (320). The CPU (310) and the PHY chip may be connected through MII (330) or serial communication (340); be powered by power supplier (350); and be connected to the network through the internet interface (360). It may be preferable to install a config pin (370) to determine the master or slave mode, and a wake-up interrupt pin (380) to generate the interrupt to respond to the power-on signal in the control unit besides from the CPU.

The config pin (370) may be a type of hardware switch and can be constructed therein to determine whether the PHY chip operates with master mode or slave mode according to its physical connection status. This is due to the fact that the in-vehicle Ethernet operates with a fixed mode as manufactured without further modification, although the commercial Ethernet where the PHY chip operates with master mode or slave mode based on the CPU setting. When the control unit is installed at the switch position in such Ethernet network, the PHY chip may operate with master mode. Meanwhile, when the control unit is installed at the end-point, it may operate with slave mode. In order to provide such control unit, another exemplary embodiment provides the PHY chip including a determining unit (not shown) for determining the configuration of config pin (370) and an operating preparation unit (not shown) for initiating the operation of the PHY chip by applying predetermined value based configuration of the config pin determined by the decision unit.

In other embodiments, the predetermined values for PHY chip configuration may consist of required values defined by required functions for the in-vehicle PHY chip and does not need additional determination from the CPU. In this respect, in an exemplary embodiment of the present invention, the predetermined value for operation of the PHY chip may be is stored in a pull-up register or a pull-down register to save as a pull-up or pull-down setting which is typically defined in the situation where no signal is detected in a digital apparatus. Moreover, a memory unit (not shown) may be used for storing the predetermined values other than the pull-up or pull-down register.

Figure 4:
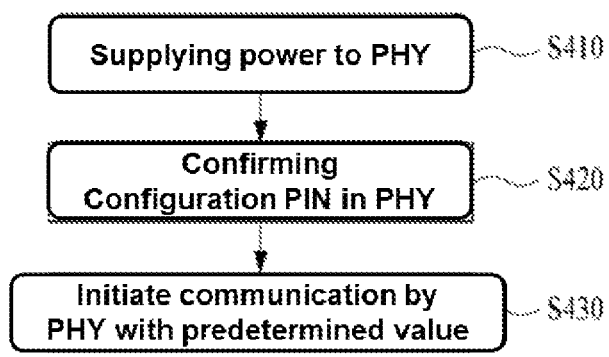
FIG. 4 is a flow diagram showing an operating process of the PHY chip in the control unit of FIG. 3 according to one embodiment of the present invention.

FIG. 4 describes an operating process of the control unit in FIG. 3. FIG. 4 is a flow diagram showing an operating process of the PHY chip in the control unit of FIG. 3 according to one embodiment of the present invention.

As shown in FIG. 4, when power is supplied to the PHY chip and the control unit receives (S410) the power-on signal through the wakeup interrupt pin (380), the PHY chip determines the configuration of config pin (370). Based on such configuration, the PHY chip may initiate operation and Ethernet communication (S430) by applying the predetermined value for either master mode or slave mode without receiving separate predetermined value from the CPU.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

The invention claimed is:

1. A physical layer device (PHY), comprising:
a first pin receiving a power-on signal from exterior;
a second pin which can be set as a first mode or a second mode;
a decision unit which determines the mode in the second pin when the power-on signal is received at the first pin; and
an operating preparation unit which initiates a communication by applying a predetermined value based on the mode in the second pin which is determined by the decision unit.

2. The physical layer device according to claim 1, wherein the first mode is a master mode and the second mode is a slave mode.

3. The physical layer device according to claim 1, wherein the physical layer device is included in a control unit within a vehicle and connected to a central processing unit (CPU) of the control unit through a first communication or a second communication.

4. The physical layer device according to claim 3, wherein the power-on signal is received from the exterior of the control unit.

5. The physical layer device according to claim 3, wherein the operating preparation unit initiates the communication by applying the predetermined value whether or not booting of the CPU is completed.

6. The physical layer device according to claim 3, wherein the first communication is a serial communication and the second communication is a Media Independent Interface (MII).

7. The physical layer device according to claim 1, wherein the predetermined value determined by the decision unit is stored in a pull-up register or a pull-down register.

8. A control unit within a vehicle which provides an Ethernet, comprising:
a central processing unit (CPU); and
a physical layer device (PHY) which is connected to the CPU through a first communication and a second communication;
wherein the physical layer device includes a first pin receiving a power-on signal from exterior and a second pin which can be set as a first mode or a second mode, and when the power-on signal is received at the first pin, the physical layer device initiates a communication by applying a predetermined value based on the mode in the second pin.

9. The control unit within the vehicle according to claim 8, wherein the first mode is a master mode and the second mode is a slave mode.

10. The control unit within the vehicle according to claim 8, wherein the physical device initiates the communication by applying the predetermined value whether or not booting of the CPU is completed.

11. The control unit within the vehicle according to claim 8, wherein the first communication is a serial communication and the second communication is a Media Independent Interface (MII).

12. The control unit within the vehicle according to claim 8, wherein the predetermined value is stored in a pull-up register or a pull-down register of the physical layer device.

13. A method of controlling a physical layer (PHY) device, comprising steps of:
receiving a power-on signal from exterior at a first pin;
determining a mode in a second pin which can be set as a first mode or a second mode; and
initiating a communication by applying a predetermined value based on the mode in the second pin.

14. The method of controlling the physical layer (PHY) device according to claim 13, wherein the first mode is a master mode and the second mode is a slave mode.

15. The method of controlling the physical layer (PHY) device according to claim 13, wherein the physical layer device (PHY) is included in a control unit within a vehicle and connected to a CPU of the control unit through a first communication and a second communication.

16. The method of controlling the physical layer (PHY) device according to claim 15, wherein the power-on signal is received from the exterior of the control unit.

17. The method of controlling the physical layer (PHY) device according to claim 15, wherein initiating the communication is performed whether or not booting of the CPU is completed.

18. The method of controlling the physical layer (PHY) device according to claim 15, wherein the first communication is a serial communication and the second communication is a Media Independent Interface (MII).

19. The method of controlling the physical layer (PHY) device according to claim 13, wherein the predetermined value is stored in a pull-up register or a pull-down register of the physical layer device.

* * * * *